United States Patent [19]

Yu

[11] Patent Number: 4,828,163

[45] Date of Patent: May 9, 1989

[54] ICE-CREAM CUP

[76] Inventor: Zhou Yu, 1139 Maple Ave., Evanston, Ill. 60202

[21] Appl. No.: 82,373

[22] Filed: Aug. 6, 1987

[51] Int. Cl.⁴ .............................................. B65D 5/38
[52] U.S. Cl. ...................................... 229/20; 229/11; 229/905; 426/110
[58] Field of Search ................ 229/20, 9, 11, 19, 101, 229/23 BF, 905, 93; 426/110

[56] References Cited

U.S. PATENT DOCUMENTS

| 654,031 | 7/1900 | Smith | 229/11 |
| 2,735,778 | 4/1956 | Taylor | 426/110 |
| 3,165,252 | 1/1965 | Carter et al. | 426/110 |

Primary Examiner—Willis Little

[57] ABSTRACT

This invention relates to an ice-cream cup that has a special bottom which comprises buffer sections that form a trough that can be slid up and down to cause the content in the cup to emerge gradually from the upper edge of said cup, while preventing leaking of said contents from the bottom edge thereof.

1 Claim, 2 Drawing Sheets

ICE-CREAM CUP

BACKGROUND OF THE INVENTION

This invention relates to an ice-cream cup.

Some manufacturers several decades ago marketed an ice-cream cup called "push-up", which is made of cardboard and which has a slidable bottom supported and pushed up by a downward bar. It was found unpleasantly that melted ice-cream leaks and drips down along the inner wall of the "push-up".

U.S. Pat. No. 3,342,609 of H. Bank and P. Carter suggested a container which has a slidable bottom and a downward push-up bar. U.S. Pat. No. 654,031 of W. Smith introduced a tobacco-holder with a slidable bottom which has an upstanding peripheral flange to improve mechanical fitting and to prevent leaking. It is an obvious suggestion to combine these two inventions to form an ice-cream cup which has a slidable bottom with a downward bar and with an upstanding peripheral flange, to better solve the leaking and dripping problem and to offer better mechanical fitting. Such a suggested design for ice-cream cup may work very well when the cup is made of some stiff materials such as cardboard. The suggested cup, however, has insolvable leaking and mechanical fitting problems, when the cup is made of some soft materials such as soft thin plastic. When comsumers consume the semi-liquid ice-cream emerging from the upper edge of the cup, a horizontal force is usually applied in addition to a vertical force and such a horizontal force forms a big bending torque around the axis which goes through the center of the slidable bottom and which is perpendicular to the horizontal force. The fitting between the wall and the bottom of the suggested soft wall cup is basically an unstable mechanical equilibrium when the big bending torque is applied. The wall and the upstanding flange separate from each other and melt ice-cream leaks and drips down. The result is that soft plastic cannot be used for such a suggested design of ice-cream cup.

This invention solves the above mentioned leaking and mechanical fitting problems, making soft materials such as soft thin plastic applicable to bottom slidable ice-cream cup. The cup of this invention has a special slidable bottom which has an upstanding fitting rim, a horizontally stretched buffer, and a vertically stretched buffer. The fitting rim and the two buffers offer stable mechanical equilibrium under a bending torque. The fitting rim and the two buffers form a trough to store melt ice-cream.

DESCRIPTION OF THE PREFERRED EMBODIMENT

Figure 1:
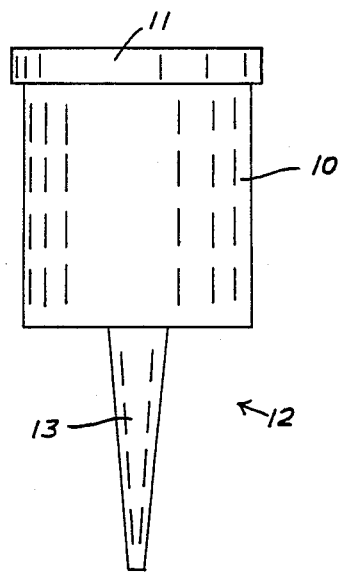
FIG. 1 shows the side elevational view of an ice-cream cup.
Figure 2:
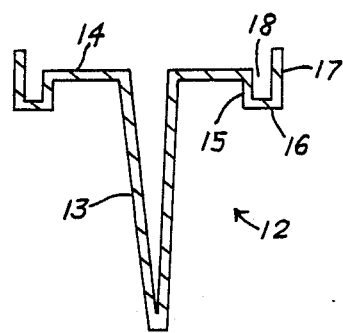
FIG. 2 shows the vertical cross-sectional view of a bottom.

FIG. 1 shows an ice-cream cup which comprises a hollow tube 10, a top cap 11, and a bottom 12. FIG. 2 shows the vertical cross-sectional view of the bottom 12 which comprises a bottom bar 13, a bottom tray 14, an upstanding fitting rim 17, a vertically stretched buffer 15, and a horizontally stretched buffer 16. Rim 17, buffer 15, and buffer 16 form a trough 18. By pushing up bottom bar 13, ice-cream is pushed up by bottom tray 14. Since the bottom center part of ice-cream melts last, there won't be much melted ice-cream getting into hollow bottom bar 13.

Buffer 15, buffer 16, trough 18, and rim 17 make this ice-cream cup materially distinguish from any prior art ice-cream cups. Trough 18 stores melted ice-cream, greatly reducing the chance for melted ice-cream to leak from the upper edge of rim 17. Under the condition a bending torque is applied to the horizontal axis going through the center of bottom tray 14, vertically stretched buffer 15 and horizontally stretched buffer 16 guarantee that rim 17 always tightly fits the inner wall of tube 10, and the rim 17 has exactly the same deformation as the deformation of the tube wall adjacent to rim 17.

Some short convexed edges may be built at the inner bottom of tube 10 to prevent bottom 12 from being pulled out. To reduce storage and transportation volume, tube 10 may be folded, bottom 12 may be piled on each other, and top 11 may be piled on each other. Single layer or multy layer plastic, metal-plated plastic, or some other soft materials may be used to build the cup. Each part of the cup may have even or uneven thickness to change strength and heat conductivity.

Figure 3:
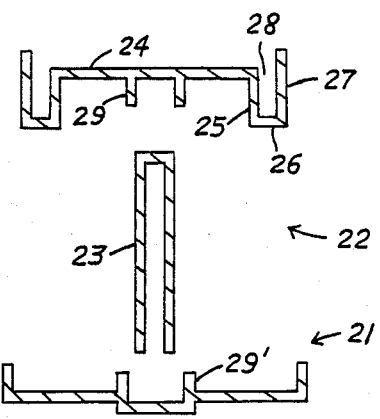
FIG. 3 shows the vertical cross-sectional view of another bottom and an upside down top cap.

FIG. 3 shows the vertical cross-sectional view of an upside down top cap 21 with a joining rim 29', and the vertical cross-sectional view of a bottom 22 which comprises a detachable bottom bar 23, a bottom tray 24, a fitting rim 27, a vertically stretched buffer 25, a horizontally stretched buffer 26, and a joining rim 29. Rim 27, buffer 25, and buffer 26 form a trough 28. The upper end and the lower end of bottom bar 23 may be plugged into joining rim 29 and joining rim 29', respectively. Therefore the top cap 21 may be used as a stable bottom support for the ice-cream cup.

The horizontal cross-section of the cup may be round, rectangular, elliptical, multilateral, or some other shapes. The cup's tube may be made such that the horizontal cross-section close to tube's upper edge is a little bit bigger, in order to prevent the dripping of melted ice-cream from tube's upper edge.

Figure 1A:
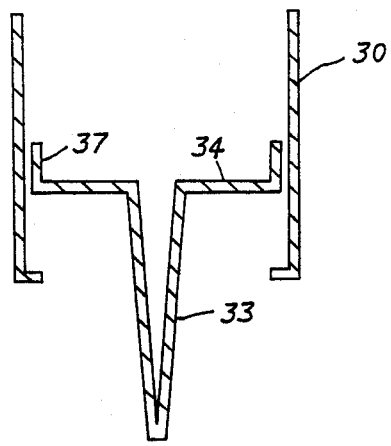
FIG. 1A shows the vertical cross-section of a suggested prior art cup.
Figure 1B:
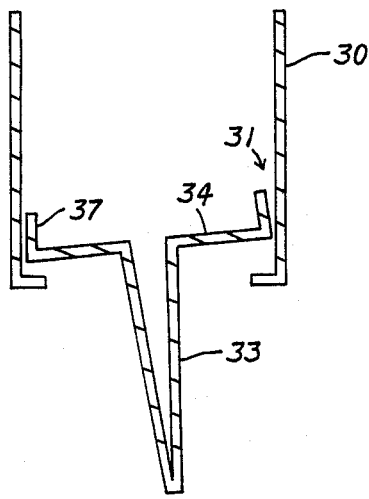
FIG. 1B shows the vertical cross-section of FIG 1A's cup, with a bending torque applied.

FIG. 1A shows the vertical cross-section of a suggested prior art cup, made by combining the cups of U.S. Pat. Nos. 654,031 and 3,342,609. The suggested prior art cup has a tube wall 30, a rim 37, a bottom tray 34, and a bottom bar 33. FIG 1B shows the vertical cross-section of the suggested prior art cup, with a bending torque applied.

Figure 2A:
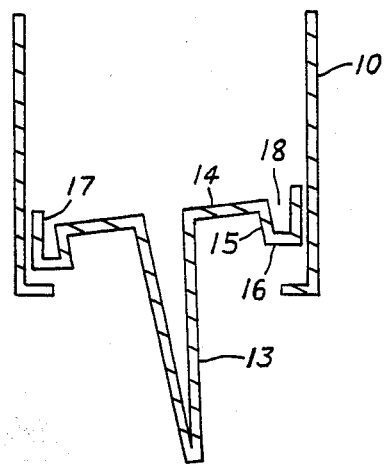
FIG. 2A shows the vertical cross-section of this invention's cup, with a bending torque applied.

FIG. 1B's cup is mechanically unstable, and a small leaking breach 31 appears, which causes melted ice-cream to drip down along the inner wall of tube 30. FIG. 2A shows the vertical cross-section of this invention's cup, with a bending torque applied. Because the cup has buffer 15 and buffer 16, there is always a tight and stable mechanical fitting, and there is no leaking of melted ice-cream.

I claim:

1. An ice-cream cup comprising a top cap, a hollow body tube, and a bottom, said bottom comprising a bottom tray, means pushing up said bottom tray, a vertically stretched buffer part stretching downwards from the rim edge of said tray, a horizontally stretched buffer part stretching outwards from the lower edge of said vertically stretched buffer part, and a vertically stretched sliding rim stretching upwards from the outer edge of said horizontally stretched buffer part, said sliding rim fitting the inner wall of said hollow body tube, said vertically stretched buffer part, said horizontally stretched buffer part, and said vertically stretched sliding rim offering an equilibrium mechanical supporting between said bottom and said body tube, forming a trough to store melted ice-cream.

* * * * *